United States Patent
Yamamoto

(10) Patent No.: US 9,036,189 B2
(45) Date of Patent: May 19, 2015

(54) IMAGE FORMING APPARATUS HAVING A FUNCTION OF REDUCING POWER CONSUMPTION BASED ON A SELECTED FREQUENCY OF USE

(71) Applicant: KYOCERA Document Solutions Inc., Osaka (JP)

(72) Inventor: Yuki Yamamoto, Osaka (JP)

(*) Notice: Subject to any disclaimer, the term of this patent is extended or adjusted under 35 U.S.C. 154(b) by 4 days.

(21) Appl. No.: 13/757,789

(22) Filed: Feb. 2, 2013

(65) Prior Publication Data

US 2013/0201524 A1 Aug. 8, 2013

(30) Foreign Application Priority Data

Feb. 2, 2012 (JP) ................... 2012-020745

(51) Int. Cl.
*G06F 3/12* (2006.01)
*H04N 1/00* (2006.01)

(52) U.S. Cl.
CPC .............. *G06F 3/12* (2013.01); *H04N 1/00832* (2013.01); *H04N 1/00891* (2013.01); *H04N 2201/0094* (2013.01)

(58) Field of Classification Search
USPC ............... 358/1.14–1.16, 409; 399/79, 82, 83
See application file for complete search history.

(56) References Cited

U.S. PATENT DOCUMENTS

| | | | | |
|---|---|---|---|---|
| 4,791,492 A | * | 12/1988 | Nagashima et al. | 358/409 |
| 7,343,115 B2 | * | 3/2008 | Oka | 399/83 |
| 2003/0103776 A1 | * | 6/2003 | Nakaue et al. | 399/58 |
| 2004/0141201 A1 | * | 7/2004 | Shima | 358/1.15 |
| 2004/0258444 A1 | * | 12/2004 | Okada et al. | 400/76 |
| 2006/0007469 A1 | * | 1/2006 | Uruma | 358/1.14 |
| 2006/0192988 A1 | * | 8/2006 | Yamanaka | 358/1.14 |
| 2006/0200704 A1 | * | 9/2006 | Takahashi et al. | 714/38 |
| 2007/0047015 A1 | * | 3/2007 | Yamada | 358/404 |
| 2007/0059014 A1 | * | 3/2007 | Oka | 399/79 |
| 2008/0079999 A1 | * | 4/2008 | Yamada | 358/1.15 |
| 2008/0168110 A1 | * | 7/2008 | Hagiwara | 707/204 |
| 2008/0198408 A1 | * | 8/2008 | Sugiura | 358/1.15 |
| 2011/0058217 A1 | * | 3/2011 | Saito | 358/1.15 |
| 2011/0063673 A1 | * | 3/2011 | Yoshida et al. | 358/1.15 |
| 2012/0026534 A1 | * | 2/2012 | Uruma | 358/1.14 |
| 2012/0081744 A1 | * | 4/2012 | Kadota | 358/1.15 |
| 2013/0050752 A1 | * | 2/2013 | Naya et al. | 358/1.15 |
| 2013/0250338 A1 | * | 9/2013 | Park | 358/1.13 |

FOREIGN PATENT DOCUMENTS

| | | | | |
|---|---|---|---|---|
| JP | 04360470 A | * | 12/1992 | ............... H04N 1/44 |
| JP | H04-360470 | | 12/1992 | |
| JP | 2007-82222 A | | 3/2007 | |

(Continued)

*Primary Examiner* — Ashish K Thomas
*Assistant Examiner* — Edwin S Leland, III
(74) *Attorney, Agent, or Firm* — Ariel S. Bentolila; Bay Area IP Group LLC

(57) ABSTRACT

Provided is an image forming apparatus having a frequency-of-use measuring unit, a power cutoff period identifying unit, a document data processing unit, and a power management unit. The frequency-of-use measuring unit measures a frequency of use of a predetermined function. The power cutoff period identifying unit identifies a power cutoff period for turning off the power on the basis of the frequency of use. The document data processing unit prints document data accumulated in a document box prior to the power cutoff period. The power management unit turns off the power when the power cutoff period is reached.

4 Claims, 6 Drawing Sheets

(56) References Cited

FOREIGN PATENT DOCUMENTS

| JP | 2007082222 | A | * | 3/2007 | H04N 1/00 |
| JP | 2008-263479 | A | | 10/2008 | |
| JP | 2008263479 | A | * | 10/2008 | H04N 1/21 |
| JP | 2010-073018 | A | | 4/2010 | |
| JP | 2010073018 | A | * | 4/2010 | G06F 1/32 |

* cited by examiner

| BOX NAME | USER NAME |
|---|---|
| 0 0 1 | USER A |
| 0 0 2 | USER B |
| 0 0 3 | USER C |

FIG.2A

| | 0:00 | | | | | | 1:00 | | | | | | 2:00 | | | | | | 3:00 | | | | | | 4:00 | | | | | | 5:00 | | | | | | 6:00 |
|---|---|---|---|---|---|---|---|---|---|---|---|---|---|---|---|---|---|---|---|---|---|---|---|---|---|---|---|---|---|---|---|---|---|---|---|---|
| USER LOGIN | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| NETWORK RECEPTION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| FACSIMILE RECEPTION | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 1 | 1 | 0 | 0 | 0 | 1 |

| | 6:00 | | | | | | 7:00 | | | | | | 8:00 | | | | | | 9:00 | | | | | | 10:00 | | | | | | 11:00 | | | | | | 12:00 |
|---|---|---|---|---|---|---|---|---|---|---|---|---|---|---|---|---|---|---|---|---|---|---|---|---|---|---|---|---|---|---|---|---|---|---|---|---|
| USER LOGIN | 0 | 0 | 0 | 0 | 0 | 0 | 0 | 0 | 0 | 0 | 0 | 1 | 0 | 0 | 1 | 1 | 1 | 1 | 1 | 1 | 1 | 1 | 1 | 1 | 1 | 0 | 1 | 1 | 1 | 1 | 1 | 0 | 1 | 1 | 1 | 1 |
| NETWORK RECEPTION | 0 | 0 | 0 | 0 | 0 | 0 | 0 | 0 | 1 | 1 | 1 | 0 | 1 | 1 | 1 | 1 | 0 | 1 | 0 | 1 | 0 | 1 | 0 | 0 | 1 | 0 | 1 | 0 | 1 | 1 | 0 | 1 | 0 | 1 | 1 | 0 |
| FACSIMILE RECEPTION | 0 | 1 | 0 | 0 | 1 | 0 | 0 | 0 | 1 | 0 | 1 | 1 | 1 | 0 | 1 | 0 | 1 | 0 | 1 | 0 | 1 | 1 | 0 | 1 | 1 | 0 | 0 | 0 | 1 | 0 | 0 | 0 | 1 | 0 | 0 | 1 |

| | 12:00 | | | | | | 13:00 | | | | | | 14:00 | | | | | | 15:00 | | | | | | 16:00 | | | | | | 17:00 | | | | | | 18:00 |
|---|---|---|---|---|---|---|---|---|---|---|---|---|---|---|---|---|---|---|---|---|---|---|---|---|---|---|---|---|---|---|---|---|---|---|---|---|
| USER LOGIN | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| NETWORK RECEPTION | 1 | 0 | 1 | 1 | 0 | 1 | 1 | 1 | 1 | 0 | 1 | 0 | 1 | 1 | 0 | 1 | 0 | 1 | 1 | 0 | 1 | 0 | 1 | 0 | 1 | 0 | 0 | 1 | 0 | 1 | 1 | 0 | 1 | 0 | 1 | 1 |
| FACSIMILE RECEPTION | 1 | 1 | 0 | 0 | 1 | 1 | 1 | 1 | 1 | 0 | 1 | 1 | 1 | 0 | 1 | 1 | 0 | 1 | 1 | 0 | 1 | 1 | 1 | 1 | 1 | 0 | 0 | 0 | 1 | 1 | 1 | 0 | 0 | 1 | 0 | 1 |

| | 18:00 | | | | | | 19:00 | | | | | | 20:00 | | | | | | 21:00 | | | | | | 22:00 | | | | | | 23:00 | | | | | | 24:00 |
|---|---|---|---|---|---|---|---|---|---|---|---|---|---|---|---|---|---|---|---|---|---|---|---|---|---|---|---|---|---|---|---|---|---|---|---|---|
| USER LOGIN | 1 | 0 | 1 | 0 | 1 | 1 | 1 | 0 | 1 | 1 | 1 | 0 | 1 | 0 | 0 | 1 | 0 | 0 | 1 | 0 | 0 | 1 | 1 | 0 | 1 | 0 | 1 | 1 | 0 | 1 | 1 | 0 | 1 | 1 | 0 | 0 |
| NETWORK RECEPTION | 0 | 1 | 0 | 0 | 0 | 0 | 1 | 0 | 0 | 0 | 0 | 1 | 0 | 1 | 0 | 1 | 1 | 0 | 1 | 1 | 0 | 1 | 0 | 0 | 1 | 0 | 0 | 0 | 1 | 0 | 0 | 0 | 0 | 0 | 0 | 0 |
| FACSIMILE RECEPTION | 1 | 0 | 0 | 0 | 0 | 1 | 0 | 0 | 0 | 1 | 0 | 0 | 0 | 1 | 0 | 1 | 0 | 0 | 0 | 1 | 0 | 0 | 0 | 0 | 0 | 1 | 0 | 0 | 0 | 0 | 0 | 1 | 0 | 0 | 0 | 1 |

FIG.3

IMAGE FORMING APPARATUS HAVING A FUNCTION OF REDUCING POWER CONSUMPTION BASED ON A SELECTED FREQUENCY OF USE

CROSS-REFERENCE TO RELATED APPLICATIONS

The present Utility patent application claims priority benefit of the Japanese patent number 2012-020745 filed on 2 Feb. 2012 under 35 U.S.C. 119(a). The contents of this related foreign patent application are incorporated herein by reference for all purposes to the extent that such subject matter is not inconsistent herewith or limiting hereof.

BACKGROUND

The present disclosure relates to an image forming apparatus having a function of receiving document data over a network.

In recent years, multifunctional image forming apparatuses have been put to practical use which are provided with document data reception functions, i.e., functions of receiving document data over a network, such as facsimiling and network printing, and a document box function, i.e., a function of accumulating document data in a box. With the multifunctional image forming apparatus, the function used by a particular user is limited, and thus there is proposed a technology which identifies the function used by a specific user, being based on the function identifying information for the respective users, and supplies power to the components necessary for the relevant function, thereby reducing the power consumption.

For example, conventional image forming apparatuses having a document data reception function are ready for receiving of document data over a network, always energizing the circuitry for the document data reception function regardless of whether it is required to be used or not. Further, with conventional image forming apparatuses having a document box function, if the power is turned off with document data being accumulated in the document box, the document data which is accumulated is erased, and therefore the circuitry for the document box function is always energized.

SUMMARY

An image forming apparatus in accordance with one aspect of the present disclosure has a communication unit for receiving document data over a network, a storage unit for accumulating the document data in a document box, and a printing unit for printing the document data, including a frequency-of-use measuring unit, a power cutoff period identifying unit, a document data processing unit, and a power management unit. The frequency-of-use measuring unit measures a frequency-of-use of a predetermined function. The power cutoff period identifying unit identifies a power cutoff period for turning off power for the image forming apparatus on the basis of the frequency of use measured by the frequency-of-use measuring unit. The document data processing unit prints and erases the document data accumulated in the document box prior to the power cutoff period. The power management unit turns off power for the image forming apparatus when the power cutoff period is reached on the condition that the document data is not accumulated in the document box.

BRIEF DESCRIPTION OF THE DRAWINGS

FIG. 2A is a figure giving an example of box name and user name for the document data stored in a document box shown in FIG. 1;

FIG. 3 is a figure giving an example of piece of frequency-of-use information generated by a frequency-of-use measuring unit shown in FIG. 1;

DETAILED DESCRIPTION

Hereinbelow, an embodiment of the present disclosure will be specifically explained with reference to the drawings.

Figure 1:
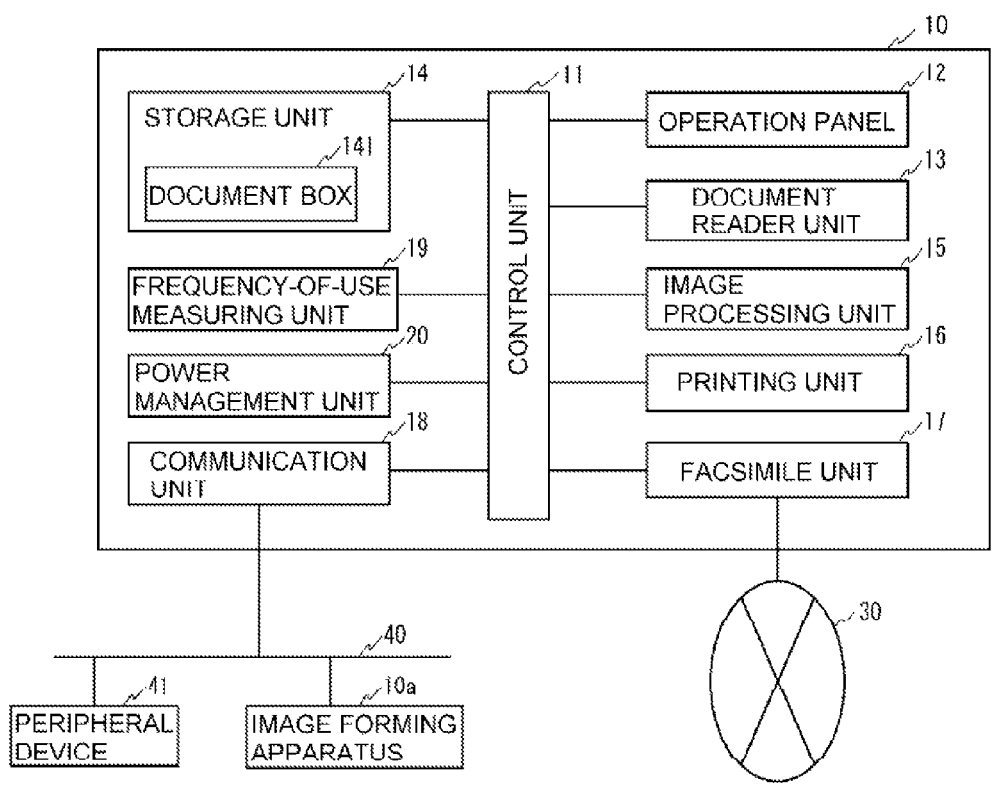
FIG. 1 is a block diagram illustrating a schematic configuration of an embodiment of an image forming apparatus in accordance with the present disclosure.

An image forming apparatus 10 according to the embodiment of the present disclosure is a multifunction machine having a copying function, a scanning function, a facsimile function, and the like. As shown in FIG. 1, the image forming apparatus 10 includes a control unit 11, an operation panel 12, a document reader unit 13, a storage unit 14, an image processing unit 15, a printing unit 16, a facsimile unit 17, a communication unit 18, a frequency-of-use measuring unit 19, and a power management unit 20.

The control unit 11 provides an information processing unit, such as a microcomputer having a ROM (Read Only Memory), a RAM (Random Access Memory), and the like. In the ROM, there is stored a control program for implementing operation control of the image forming apparatus 10. The control unit 11 reads the control program stored in the ROM to load it in the RAM, thereby controlling the entire apparatus according to a predetermined piece of instruction information input from the operation panel 12.

The operation panel 12 provides a set of user interfaces including a variety of operation keys, such as a touch screen, a numeric keypad for inputting a numerical value such as the number of prints, a reset key for initializing the set information, a stop key for stopping the copying operation or erasing the input numerical value, an interrupt key for instructing of interrupt copy, and a start key for inputting an output instruction to start printing operation.

The document reader unit 13 provides a scanner which irradiates light onto a document fed by a document feeder (not shown) or a document placed on a platen glass by the user, and receives the reflected light for reading the document image.

Figure 2B:
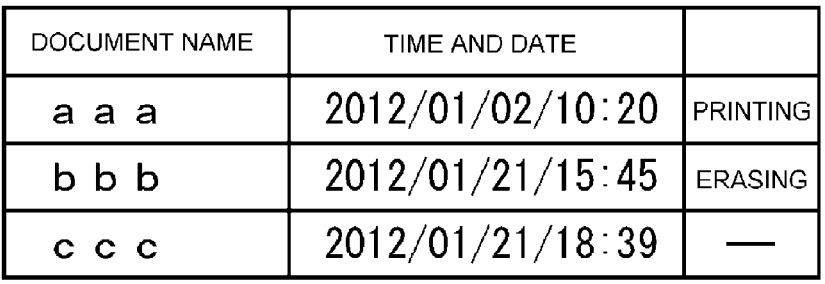
FIG. 2B is a figure giving an example of document name, time and date, and piece of action information at the time of power cutoff, stored together with the document data in a document box shown in FIG. 1.

The storage unit 14 provides a storage means, such as a semiconductor memory, an HDD (Hard Disk Drive), or the like, for accumulation of document data read by the document reader unit 13, and of document data received by the facsimile unit 17 or the communication unit 18. In the storage unit 14, a document box 141 is set. The document box 141 is a storage region provided for each particular user, and in which document data is accumulated by the user. As shown in FIG. 2A, the document box 141 for each particular user is provided with a "box name" and a "user name". Further, as shown in FIG. 2B, the document box 141 stores a "document name" a "time and date" when the document data was accumulated, and a piece of action information at the time of power cutoff, together with the document data. The piece of action information at the time of power cutoff is a piece of information for selecting "printing", which instructs printing of the document data at the time of power cutoff, or "erasing", which instructs erasing the document data at the time of power cutoff, and the setting is made by the user at the time of document data accumulation. FIG. 2B gives an example of piece of action information at the time of power cutoff; for the document data having a document name of "aaa", the piece of action information at the time of power cutoff is set at "printing", while, for the document data having a document name of "bbb", the piece of action information at the time of power cutoff is set at "erasing". FIG. 2B gives another example of piece of action information at the time of power cutoff; for the document data having a document name of "ccc", the piece of action information at the time of power cutoff is set at neither "printing" nor "erasing".

The image processing unit 15 provides means for implementing a predetermined type of image processing on the document data, such as enlargement/reduction processing, or image improvement processing, such as density adjustment or tone adjustment. Further, the image processing unit 15 has an encryption function of converting the document data as accumulated in the document box 141 into encrypted image data, and a decryption function of decrypting the image data converted by the encryption function into document data to be accumulated in the document box 141.

The printing unit 18 provides a printing means for printing a document image on the basis of the image data read by the document reader unit 13, the document data stored in the storage unit 14, or the document data received by the facsimile unit 17 or the communication unit 18.

The facsimile unit 17 has a modulator-demodulator, being provided with a facsimile transmission function of generating a facsimile signal from the image data read by the document reader unit 13 or the document data stored in the document box 141 of the storage unit 14, and transmitting the generated facsimile signal through a network 30, such as a telephone network, and a facsimile reception function of receiving a facsimile signal through the network 30, such as a telephone network, and generating document data from the received facsimile signal. The document data received and generated by the facsimile reception function is stored in the document box 141, or printed by the printing unit 16.

The communication unit 18 has a function of sending/receiving a variety of data between a peripheral device 41, such as a personal computer, and another image forming apparatus 10a through a network 40.

The frequency-of-use measuring unit 19 functions as a frequency-of-use measuring means which divides one day into a predetermined number of unit periods of time, and, for the respective unit periods of time, determines whether or not a predetermined function has been used, and continues such operation over a predetermined term (such as one week or one month), thereby generating a piece of frequency-of-use information. Further, the frequency-of-use measuring unit 19 also functions as a power cutoff period identification means which, on the basis of the piece of frequency-of-use information generated by the measurement over the predetermined term, identifies a time span in which a unit period of time in which none of the predetermined functions is used is repeated a predetermined number of times or more, as a power cutoff period, and notifies the power management unit 20 of the power cutoff period identified. As shown in FIG. 3, the present embodiment is configured such that a piece of frequency-of-use information is generated by dividing one day into unit periods of 10 minutes, and, for each of the unit periods of 10 minutes, determining whether or not the respective functions of "user login", "network reception" and "facsimile reception" have been used. And on the basis of the generated piece of frequency-of-use information, a time span in which a unit period of time in which none of the functions of "user login", "network reception" and "facsimile reception" is used (hereafter referred to as a unit period of time of non-use) is repeated a predetermined number of times or more is identified as a power cutoff period. In an example of piece of frequency-of-use information as given in FIG. 3, the numeral "1" denotes that the pertinent function has been used in the pertinent unit period of time, while the numeral "0" denotes that the pertinent function has not been used in the pertinent unit period of time.

The power management unit 20 provides a power management means which manages the power on/off for the image forming apparatus 10. The same unit has a clock function which is capable of counting even when the power for the image forming apparatus 10 is turned off. And, the power management unit 20 transmits a power cutoff notice to the control unit 11 just prior to or at the time of the power cutoff period being reached which has been identified by the frequency-of-use measuring unit 19. In addition, when a document processing completion notice from the control unit 11 is received with the power cutoff period having been reached, the power for the image forming apparatus 10 is turned off. In other words, when a power cutoff period is reached, the power management unit 20 turns off the power for the image forming apparatus 10 on the condition that no document data is accumulated in the document box 141. Further, when the power cutoff period has elapsed, the power management unit 20 turns on the power for the image forming apparatus 10.

Figure 4:
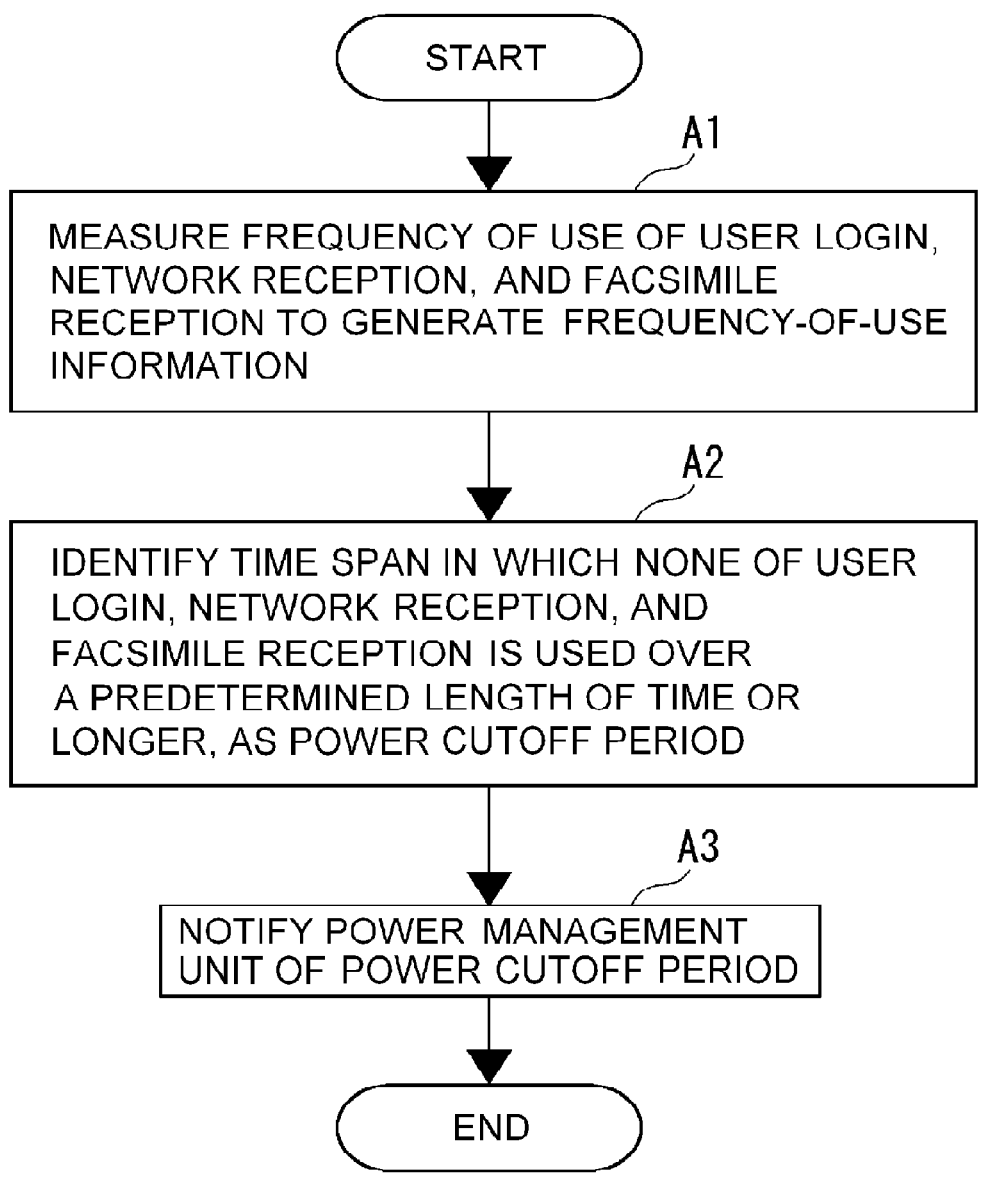
FIG. 4 is a flowchart for explaining a frequency-of-use measuring operation to be made by the frequency-of-use measuring unit shown in FIG. 1.

Next, the frequency-of-use measuring operation made by the frequency-of-use measuring unit 19 will be explained in detail with reference to the FIG. 4. As illustrated in FIG. 4, if an input for instructing start of the frequency-of-use measuring operation is given from the operation panel 12, the frequency-of-use measuring unit 19 performs frequency-of-use measurement for the functions of "user login", "network reception" and "facsimile reception" to generate a piece of frequency-of-use information (step A1). The predetermined term in which frequency-of-use measurement is to be performed may be factory set or may be set by the user. In addition, a particular function the frequency-of-use of which is to be measured may be factory set or may be set by the user. In the present embodiment, whether or not the "user login" as an object of measurement is used is determined on the basis of whether or not a user authentication has been given to make the image forming apparatus 10 operable through the use of the operation panel 12. Further, whether or not the "network reception" is used is determined on the basis of whether or not document data has been received through the network 40, such as a LAN. Furthermore, whether or not the "facsimile reception" is used is determined on the basis of whether or not document data has been received through the network 30, such as a telephone network.

Next, on the basis of the generated piece of frequency-of-use information, the frequency-of-use measuring unit 19 identifies a time span in which none of the functions of "user login", "network reception" and "facsimile reception" is used over a predetermined length of time or longer, as a power cutoff period (step A2), and notifies the power management unit 20 of the power cutoff period identified (step A3). As shown in FIG. 3, the present embodiment is configured such that a piece of frequency-of-use information is generated by dividing one day into unit periods of 10 minutes, and, for each of the unit periods of 10 minutes, determining whether or not the respective functions of "user login", "network reception" and "facsimile reception" have been used. And, a time span in which a unit period of time of non-use is repeated a predetermined number of times or more is identified as a power cutoff period. For example, in the case where a time span in which a unit period of time of non-use is repeated three times or more (in other words, is continued over 30 minutes or longer) is to be identified as a power cutoff period, in an example of piece of frequency-of-use information that is given in FIG. 3, a time span from 0:20 to 4:30 is identified as a power cutoff period.

The present embodiment is configured such that an instruction input from the operation panel 12 causes the frequency-of-use measurement to be started, however, it maybe configured such that the frequency-of-use measurement is started on the initial power up of the image forming apparatus 10 or periodically. In addition, a piece of frequency-of-use information may be generated for each day of the week, and in such case, a power cutoff period can be identified for each day of the week.

Figure 5:
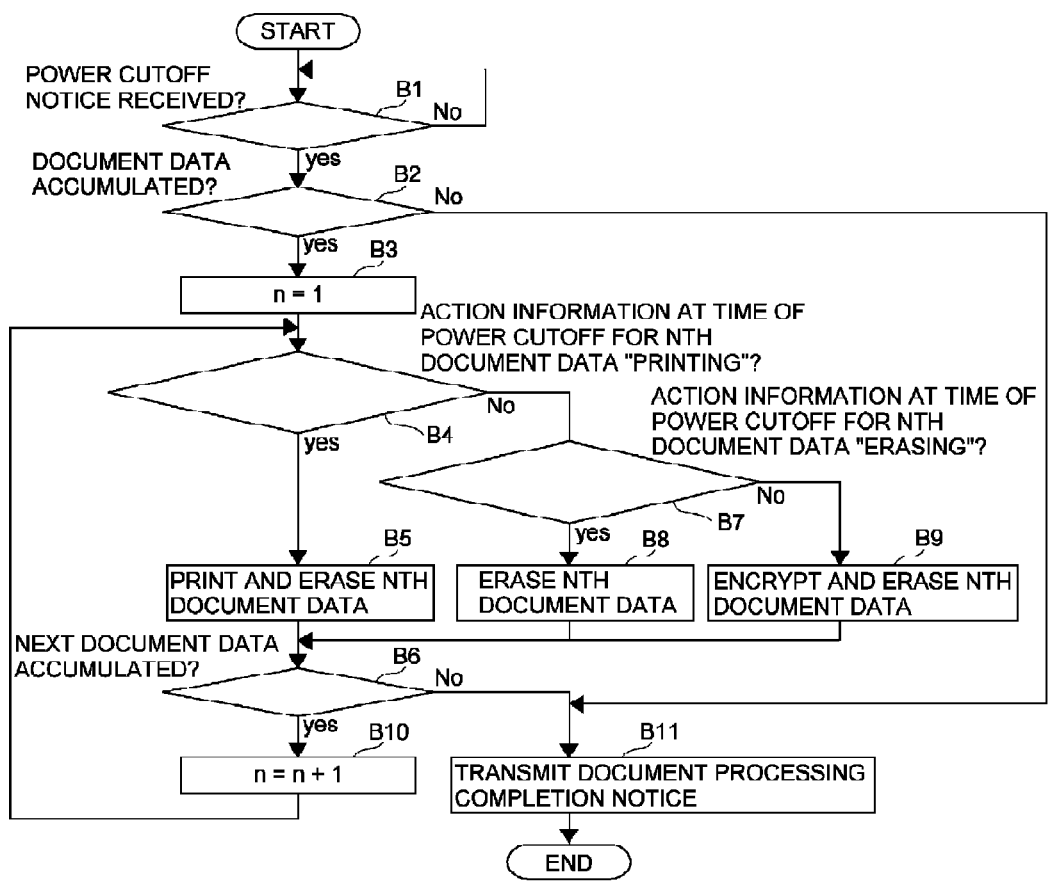
FIG. 5 is a flowchart for explaining a document data processing operation to be performed at the time of power cutoff made by a power management unit shown in FIG. 1.

Next, the document data processing operation which is performed by the power management unit 20 at the time of power cutoff will be explained in detail with reference to FIG. 5.

The power management unit 20 transmits a power cutoff notice to the control unit 11 just prior to or at the time of the power cutoff period being reached which has been identified by the frequency-of-use measuring unit 19. The control unit 11 supervises reception of the power cutoff notice from the power management unit 20 (step B1). And, when the power cutoff notice from the power management unit 20 is received at step B1, the control unit 11 determines whether or not there is document data accumulated in the document box 141 in the storage unit 14 (step B2).

If it is determined at step B2 that there is document data accumulated in the document box 141, the control unit 11 first sequentially numbers the document data accumulated in the document box 141 from 1, setting the variable n at 1 (step B3). Next, the control unit 11 determines whether or not the action information at the time of power cutoff for the nth document data is "printing" (step B4).

If it is determined at step B4 that the piece of action information at the time of power cutoff is "printing", the control unit 11 uses the printing unit 16 to execute the printing processing of printing and erasing the nth document data and (step B5), and determines whether or not there is the next document data accumulated in the document box 141 (step B6).

If it is determined at step B4 that the piece of action information at the time of power cutoff is not "printing", the control unit 11 determines whether or not the piece of action information at the time of power cutoff for the nth document data is "erasing" (step B7). If it is determined at step B7 that the piece of action information at the time of power cutoff is "erasing", the control unit 11 uses the printing unit 16 to execute the erasing processing of erasing the nth document data without printing it (step B8), and determines whether or not there is the next document data accumulated in the document box 141 (step B6).

If it is determined at step B7 that the piece of action information at the time of power cutoff is not "erasing", in other words, the piece of action information at the time of power cutoff for the nth document data is not set, the control unit 11 uses the image processing unit 15 to convert the nth document data into encrypted image data, executing the encryption printing processing of using the printing unit 16 to print the image data and erase the nth document data (step B9), and determines whether or not there is the next document data accumulated in the document box 141 (step B6).

If it is determined at step B6 that there is the next document data, the control unit 11 increments the variable n by 1 (step B10), returning to step B4. Thereby, until there is no document data accumulated in the document box 141, the processing from step B4 to B10 is repeated.

If it is determined at step B2 that there is no document data accumulated in the document box 141, or if it is determined at step B6 that there is not the next document data, the control unit 11 transmits a document processing completion notice to the power management unit 20 (step B11), terminating the document data processing operation to be performed at the time of power cutoff. When the power management unit 20 receives the document processing completion notice from the control unit 11 with the power cutoff period having been reached, the power management unit 20 turns off the power for the image forming apparatus 10. Thereby, in a state in which no document data is accumulated in the document box 141, the power for the image forming apparatus 10 is turned off.

The present embodiment is configured such that, according to the piece of action information at the time of power cutoff, any one of the printing processing at step B5, the erasing processing at step B8, and the encryption printing processing at step B9 is executed, and thus the type of processing of the document data accumulated in the document box 141 at the time of power cutoff by the power management unit 20 can be selected, however, a previously set type of processing (the printing processing at step B5 or the encryption printing processing at step B9) maybe executed with no piece of action information at the time of power cutoff being provided. In addition, in the case where communication to the peripheral device 41 or another image forming apparatus 10a is capable through the network 40, the document data accumulated in the document box 141 may be erased by saving it in the peripheral device 41 or the another image forming apparatus 10a through the network 40 prior to the power cutoff by the power management unit 20.

As described above, the present embodiment provides an image forming apparatus 10 having a function of receiving document data over the network 30 or 40, a function of accumulating the document data in the document box 141, and a function of printing the document data by the printing unit 16, being configured such that the frequency-of-use measuring unit 19 identifies a power cutoff period for turning off the power for the image forming apparatus 10 on the basis of the frequency of use measured; the control unit 11 functions as a document data processing means for using the printing unit 16 to print and erase the document data accumulated in the document box 141 just prior to or at the time of the power cutoff period being reached; and the power management unit 20 turns off the power for the image forming apparatus 10 when the power cutoff period is reached, on the condition that no document data is accumulated in the document box 141. Thereby, according to the present embodiment, the power consumption can be reduced, while, with conventional image forming apparatuses having a document data reception function or a document box function, power is wastefully consumed. In other words, according to the present embodiment, advantages can be offered that, even if document data is accumulated in the document box, the power for the image forming apparatus 10 can be turned off when the power cutoff period is reached, whereby the power consumption can be reduced. The control unit 11 may be configured such that, just prior to or at the time of the power cutoff period being reached, the document data accumulated in the document box 141 may be erased by saving it over the network.

Further, according to the present embodiment, the control unit 11 is configured such that, just prior to or at the time of the power cutoff period being reached, the document data accumulated in the document box 141 is converted into encrypted image data by using the image processing unit 15, and the converted image data is printed by use of the printing unit 16. Thereby, even if the document data accumulated in the document box 141 is printed against the intention of the user, there is no possibility of the document data being visible to other persons.

It is obvious that the present disclosure is not limited to the embodiment as described above and the embodiment can be modified as appropriate within the scope of the technological concept of the present embodiment.

What is claimed is:

1. An image forming apparatus having a communication unit for receiving document data over a network, a storage unit for accumulating the document data in a document box, and a printing unit for printing the document data, comprising:
    a frequency-of-use measuring unit for measuring a frequency of use of a predetermined function,
    a power cutoff period identifying unit for identifying a power cutoff period for turning off power for the image forming apparatus on the basis of the frequency-of-use measured by the frequency-of-use measuring unit;
    a document data processing unit for printing and erasing the document data accumulated in the document box prior to the power cutoff period,
    a power management unit for turning off the power for the image forming apparatus upon the power cutoff period being reached with the document data being not accumulated in the document box;
    an image processing unit for converting the document data into encrypted image data, and
    the document data processing unit for using the image processing unit to convert the document data accumulated in the document box into encrypted image data prior to the power cutoff period for printing it; and wherein
    the power cutoff period identifying unit identifies a time span in which a unit period of time in which none of the functions is used is repeated a predetermined number of times or more, as the power cutoff period, and wherein, the power cutoff period identifying unit can set the unit period of time to be measured as a time none of the functions for user login, network reception, and facsimile reception is used, or one or more of these are not used.

2. The image forming apparatus according to claim 1, wherein apiece of action information at the time of power cutoff is accumulated in the document box together with the document data, and the document data processing unit causes, prior to the power cutoff period, printing of the document data for which printing is instructed with the piece of action information at the time of power cutoff, and erasing of the document data for which erasing is instructed with the piece of action information at the time of power cutoff.

3. The image forming apparatus according to claim 2, wherein the document data processing unit uses, prior to the power cutoff period, the image processing unit to convert the document data for which the piece of action information for printing and erasing it at the time of power cutoff is not set into encrypted image data.

4. An image forming apparatus having a function of sending and receiving document data over a network, a function of accumulating the document data in a document box, and a function of printing the document data, comprising: a control unit, executing:
    a frequency-of-use measuring unit for measuring a frequency-of-use of a predetermined function,
    a power cutoff period identifying unit for identifying a power cutoff period for turning off power for the image forming apparatus on the basis of the frequency-of-use measured by the frequency-of-use measuring unit,
    a document data processing unit for saving the document data accumulated in the document box over the network prior to the power cutoff period,
    a power management unit for turning off power for the image forming apparatus upon the power cutoff period being reached
    an image processing unit for converting the document data into encrypted image data, and
    the document data processing unit for using the image processing unit to convert the document data accumulated in the document box into encrypted image data prior to the power cutoff period for printing it; and wherein
    the power cutoff period identifying unit identifies a time span in which a unit period of time in which none of the functions is used is repeated a predetermined number of times or more, as the power cutoff period, and wherein, the power cutoff period identifying unit can set the unit period of time to be measured as a time none of the functions for user login, network reception, and facsimile reception is used, or one or more of these are not used.

* * * * *